United States Patent
Mangrum

(10) Patent No.: US 7,764,418 B2
(45) Date of Patent: Jul. 27, 2010

(54) SLOPED CANTILEVER BEAM ELECTRODE FOR A MEMS DEVICE

(75) Inventor: Brett A. Mangrum, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 12/335,680

(22) Filed: Dec. 16, 2008

(65) Prior Publication Data

US 2009/0097091 A1    Apr. 16, 2009

Related U.S. Application Data

(62) Division of application No. 11/498,596, filed on Aug. 2, 2006, now Pat. No. 7,466,476.

(51) Int. Cl.
  *G02B 26/00* (2006.01)
  *G02B 26/08* (2006.01)
(52) U.S. Cl. .............. 359/290; 359/225.1; 359/295
(58) Field of Classification Search ........ 359/198, 359/214, 225, 290–292, 295, 298, 198.1, 359/214.1, 225.1
See application file for complete search history.

(56) References Cited

U.S. PATENT DOCUMENTS

| 6,383,357 | B1 | 5/2002 | Maciossek |
| 6,487,001 | B2 | 11/2002 | Greywall |
| 6,552,840 | B2 | 4/2003 | Knipe |
| 6,825,967 | B1 | 11/2004 | Chong et al. |
| 6,825,968 | B2 | 11/2004 | Aubuchon |
| 6,900,922 | B2 | 5/2005 | Aubuchon |
| 7,365,898 | B2 | 4/2008 | Gong et al. |
| 7,402,880 | B2 | 7/2008 | Neidrich |
| 7,430,072 | B2 | 9/2008 | Roth et al. |
| 7,466,476 | B2 | 12/2008 | Mangrum |
| 2004/0150868 | A1 | 8/2004 | Ljungblad et al. |
| 2005/0152019 | A1 | 7/2005 | Mushika |
| 2005/0195461 | A1 | 9/2005 | Mochizuki |
| 2007/0001542 | A1 | 1/2007 | Neidrich |
| 2007/0018065 | A1 | 1/2007 | Denatale et al. |
| 2007/0141516 | A1 | 6/2007 | Neidrich |

OTHER PUBLICATIONS

Wagner, B., et al., "Bistable Microvalve with Pneumatically Coupled Membranes", 1996 IEEE, pp. 384-388.

Wagner, B., et al., "Infrared Micromirror Array with Large Pixel Size and Large Deflection Angle", Transducers '97, 1997 International Conference on Solid-State Sensors and Actuators, 1997 IEEE, pp. 75-78.

Reimer, K., et al., "16k Infrared Micromirror Arrays with Large Beam Deflection and Tenth Millimeter Pixel Size", Part of the SPIE Conference on Miniaturized Systems with Micro-Optics and MEMS, SPIE vol. 3878, pp. 272-280.

(Continued)

*Primary Examiner*—William C Choi
(74) *Attorney, Agent, or Firm*—Charles A. Brill; Wade James Brady, III; Frederick J. Telecky, Jr.

(57) ABSTRACT

A method of tilting a micromirror includes providing a substrate, a sloped electrode outwardly from the substrate, and a sloped electrode positioning system outwardly from the substrate. The method also includes applying, by the sloped electrode positioning system, forces sufficient to position the sloped electrode in an orientation that slopes away from the substrate.

8 Claims, 3 Drawing Sheets

OTHER PUBLICATIONS

Fraunhofer Institut Siliziumtechnologie, "Achievements and Results Annual Report 2001", pp. 1-5 and 40-41.

Sawada, Renshi, et al., "Improved Single Crystalline Mirror Actuated Electrostatically by Terraced Electrodes with High-Aspect Ratio Torsion Spring", 2003 IEEE, pp. 153-154.

Urano, M., et al, "Novel Fabrication Process and Structure of a Low-Voltage-Operation Micromirror Array for Optical MEMS Switches", 2003 IEEE, IEDM 03-965, -03-968, 39.5.1-39.5.4.

Cichalewski, Wojciech et al., "Analytical Modelling and Simulations of a MEMS Micro-Mirror—MATLAB Implementation", CADSM 2003, pp. 360-365.

Yamamoto, Tsuyoshi, et al., "A Three-Dimensional MEMS Optical Switching Module Having 100 Input and 100 Output Ports", IEEE Photonics Technology Letters, vol. 15, No. 10, pp. 1360-1362.

Yamamoto, Tsuyoshi, et al., "Development of a Large-Scale 3D MEMS Optical Switch Module", Selected Papers, NTT Technical Review, vol. 1, No. 7, pp. 37-42.

von Trotha, Lebrecht, et al., "Advanced MEMS Fabrication Using CMP", http://www.reed-electronics.com/semiconductor/index.asp/layout=articlePrint&article ID=CA440, pp. 1-5.

Fraunhofer Institut fur Silizium Technologie, "Digital Micromirror Arrays", http://www.isit.fhg.de/english/mst/micromirror.html, 2 pages.

Rao, Masa P., et al., "Bulk Micromachined Titanium Micromirror Device with Sloping Electrode Geometry", Mechanical & Environmental Engineering Department, University of California, Santa Barbara, Santa Barbara, California, 4 pages.

Urano, M., et al., "Fabrication of Low-Voltage Optical MEMS Switches by Using Seamless Integration Technology", NTT Microsystem Integration Laboratories, Kanagawa, Japan, 1 page.

SLOPED CANTILEVER BEAM ELECTRODE FOR A MEMS DEVICE

This application is a divisional of application Ser. No. 11/498,596, filed Aug. 2, 2006.

TECHNICAL FIELD

This invention relates in general to microelectromechanical systems (MEMS) and, in particular, to a sloped cantilever beam electrode for a digital micromirror device (DMD).

BACKGROUND

Microelectromechanical systems (MEMS) often comprise electrostatic fields in their operation. Digital micromirror devices (DMD) are a particular MEMS device capable of being used in optical communication and/or projection display systems. DMDs involve an array of micromirrors that selectively communicate at least a portion of an optical signal or light beam. DMDs selectively communicate an optical signal or light beam by pivoting between active "on" and "off" states. To permit the micromirrors to pivot, each micromirror is attached to a hinge that is suspended between one or more support posts.

OVERVIEW OF EXAMPLE EMBODIMENTS

In one embodiment, an apparatus for use with a digital micromirror device (DMD) includes a substrate, a micromirror, and a pair of electrode systems each having an electrode positioning system. The micromirror is disposed outwardly from the substrate and capable of pivoting about a pivot point. The electrode systems are disposed inwardly from the micromirror on opposite sides of the pivot point. Each electrode system is operable to apply electrostatic forces on the micromirror in response to receiving a voltage. In addition, each electrode system has a sloped portion sloping away from the substrate. Each electrode positioning system is operable to position the sloped portion in an orientation sloping away from the substrate.

In a method embodiment, a method of tilting a micromirror includes providing a substrate, a sloped electrode outwardly from the substrate, and a sloped electrode positioning system outwardly from the substrate. The method also includes applying, by the sloped electrode positioning system, forces sufficient to position the sloped electrode in an orientation that slopes away from the substrate.

Depending on the specific features implemented, particular embodiments of the present invention may exhibit some, none, or all of the following technical advantages. Various embodiments may be capable of enhancing the electrostatic coupling between conductive layers, with benefits that include, but are not limited to, balancing the electrostatic fields across conductive layers, increasing the transitioning speed of each micromirror, and increasing the magnitude of the electrostatic fields between conductive layers. Some embodiments may be capable of enabling an increased micromirror thickness without compromising reliability.

Other technical advantages will be readily apparent to one skilled in the art from the following figures, description and claims. Moreover, while specific advantages have been enumerated, various embodiments may include all, some or none of the enumerated advantages.

BRIEF DESCRIPTION OF THE DRAWINGS

For a more complete understanding of the present invention, and for further features and advantages thereof, reference is now made to the following description taken in conjunction with the accompanying drawings, in which.

DETAILED DESCRIPTION OF EXAMPLE EMBODIMENTS

Particular examples and dimensions specified throughout this document are intended for example purposes only, and are not intended to limit the scope of the present disclosure. In particular, this document is not intended to be limited to a particular microelectromechanical system (MEMS) device in a spatial light modulator application, such as, a digital micromirror device. Moreover, the illustrations in the FIGURES are not necessarily drawn to scale.

Figure 1:
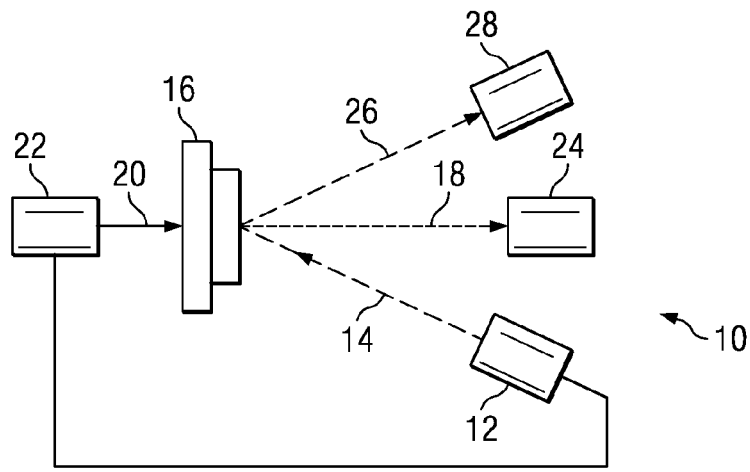
FIG. 1 is a block diagram of one embodiment of a portion of a display system.

FIG. 1 is a block diagram of one embodiment of a portion of a display system 10 that may be used with other embodiments of the invention. The display system 10 of FIG. 1 includes a light source module 12 capable of generating illumination light beams 14. Light beams 14 are directed from light source module 12 to a modulator 16. Modulator 16 may comprise any device capable of selectively communicating at least some of the received light beams along a projection light path 18. In various embodiments, modulator 16 may comprise a spatial light modulator, such as, for example, a liquid crystal display, a light emitting diode modulator, or a liquid crystal on silicon display. In the illustrated embodiment, however, modulator 16 comprises a digital micromirror device (DMD).

As will be described in more detail below, a DMD is a microelectromechanical device comprising an array of hundreds of thousands of tilting digital micromirrors. In a flat or neutral state, each micromirror may be substantially parallel to projection lens 24. From the flat state, the micromirrors may be tilted, for example, to a positive or negative angle corresponding to an "on" state and an "off" state. In particular embodiments, the micromirrors may tilt, for example, from +12 degrees to a −12 degrees. Although particular embodiments, may have micromirrors that tilt from +12 degrees to a −12 degrees, any other appropriate tilt angle may be used without departing from the scope of the present disclosure. To permit the micromirrors to tilt, each micromirror attaches to one or more hinges mounted on support posts, and spaced by means of an air gap over underlying control circuitry. The control circuitry provides the desired voltages to the respective layers, based at least in part on image data 20 received from a control module 22. In various embodiments, modulator 16 is capable of generating various levels or shades for each color received.

Electrostatic forces cause each micromirror to selectively tilt. Incident illumination light on the micromirror array is reflected by the "on" micromirrors along projection path 18 for receipt by projection lens 24. Additionally, illumination light beams 14 are reflected by the "off" micromirrors and directed on off-state light path 26 toward light absorber 28. The pattern of "on" versus "off" mirrors (e.g., light and dark mirrors) forms an image that is projected by projection lens 24. As used in this document, the terms "micromirrors" and "pixels" are used inter-changeably.

Light source module 12 includes one or more lamps or other light sources capable of generating and focusing an illumination light beam. Although display system 10 is described and illustrated as including a single light source module 12, it is generally recognized that display system 10 may include any suitable number of light sources modules appropriate for generating light beams for transmission to modulator 16.

As discussed above, display system 10 includes a control module 22 that receives and relays image data 20 to modulator 16 to effect the tilting of micromirrors in modulator 16. Specifically, control module 22 may relay image data 20 that identifies the appropriate tilt of the micromirrors of modulator 16. For example, control module 22 may send image data 20 to modulator 16 that indicates that specific micromirrors of modulator 16 should be positioned in the "on" state. Accordingly, the micromirrors may be positioned at a tilt angle on the order of approximately +12 degrees, as measured from projection path 18. Alternatively, control module 22 may send image data 20 to modulator 16 that indicates specific micromirrors should be positioned in the "off" state. As such, the micromirrors may be positioned at a tilt angle on the order of approximately −12 degrees, as measured from projection path 18.

Figure 2B:
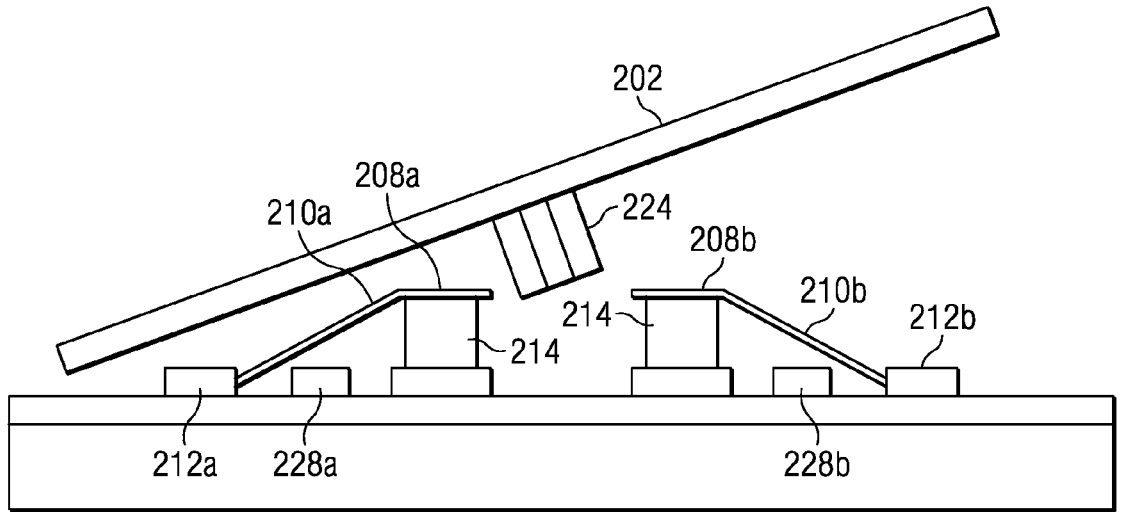
FIGS. 2B to 2E are cross-sectional views illustrating example methods of forming a portion of a digital micromirror device.
Figure 2C:
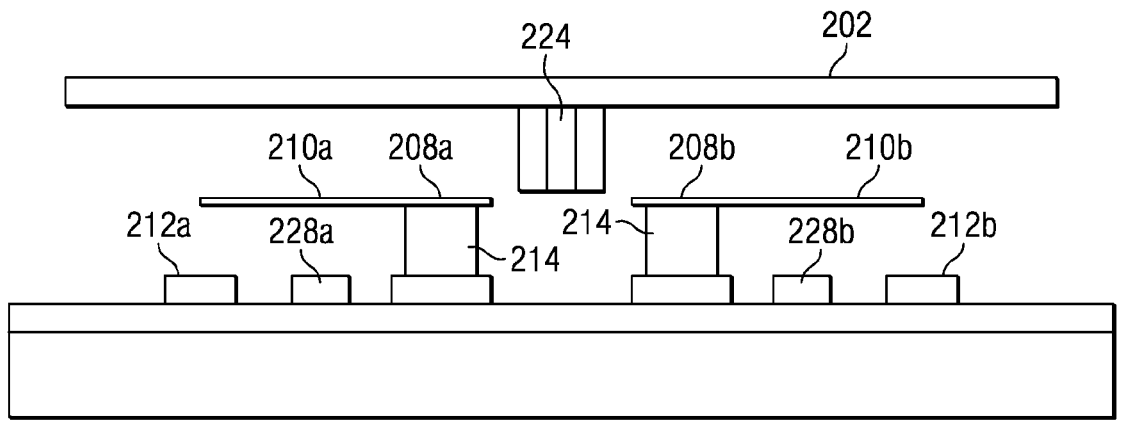
Figure 2A:
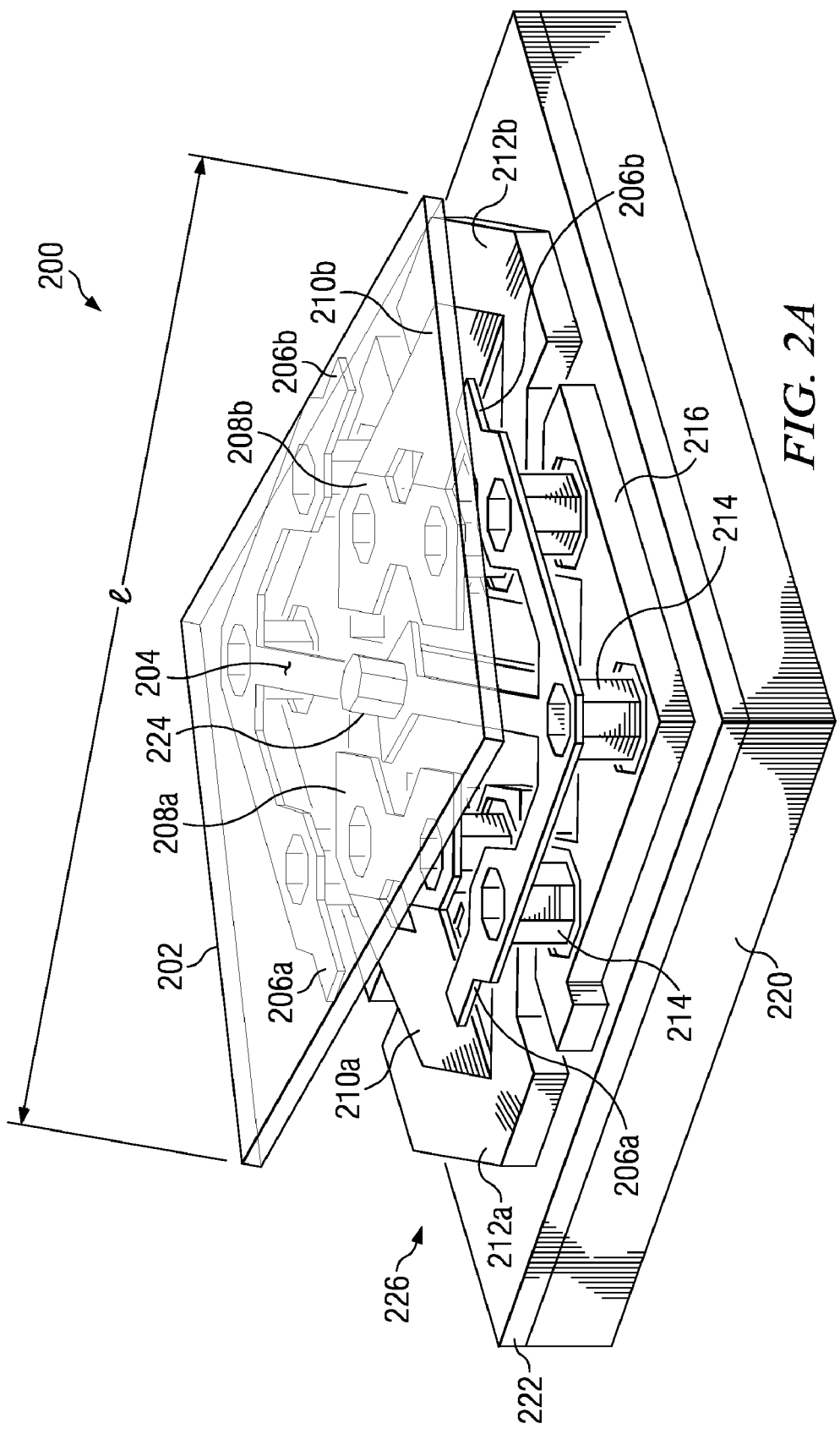
FIG. 2A is perspective view of one embodiment of a portion of a digital micromirror device.

FIG. 2A is a perspective view of one embodiment of a portion of a digital micromirror (DMD) device 200. As discussed above with regard to modulator 16 of FIG. 1, DMD 200 may include an array of hundreds of thousands of tilting micromirrors (e.g., micromirror 202). Each micromirror 202 is generally a portion of a pixel element 226 fabricated monolithically over a complementary metal-oxide semiconductor ("CMOS") substrate 220. In particular embodiments, the CMOS substrate 220 includes component parts of control circuitry operable to manipulate micromirror 202. For example, the CMOS substrate 220 may include an SRAM cell or other similar structure for performing the operations of each micromirror 202. Each pixel element 226 may generally include a mirror portion, a hinge portion, and an address portion.

The mirror portion of each pixel element 226 in the illustrated embodiment uses a reflective material such as aluminum or other material to reflect incident light to produce an image through projection lens 24. In some embodiments, the reflective material may be a micromirror 202. In particular embodiments, the micromirror 202 may be approximately 13.7 microns in size and have approximately a one micron gap between adjacent micromirrors. The described dimensions, however, are merely one example configuration of micromirrors 202. It is generally recognized that, in other embodiments, each micromirror 202 may be smaller or larger than the above described example. For example, in particular embodiments, each micromirror may be less than thirteen microns in size. In other embodiments, each micromirror may be approximately seventeen microns in size.

The hinge portion of each pixel element 226 in the illustrated embodiment, includes one or more hinges 204 which are supported by hinge posts or hinge vias 208. Each hinge 204 may be made of aluminum, titanium, tungsten, aluminum alloys, such as AlTiO, or other material suitable for supporting and manipulating micromirrors 202. In operation, the one or more hinges 204 may be used to tilt each micromirror 202 such that the micromirrors 202 may be alternated between an active "on" state or an active "off" state to selectively communicate at least a portion of an optical signal or light beam. For example, and as described above with regard to FIG. 1, hinges 204 may operate to tilt micromirrors 202 from a plus twelve degrees to a minus twelve degrees to alternate the micromirrors 202 between the active "on" state condition and the active "off" state condition, respectively.

The micromirrors 202 are generally supported above the hinge 204 by a mirror via 224. In the illustrated embodiment, the range of motion given to micromirrors 202 may be limited by spring-tip pairs 206a and 206b within the hinge layer. Thus, micromirrors 202 may be tilted in the positive or negative direction until the micromirror 202 contacts and compresses spring-tip pairs 206a or 206b respectively. Although this example includes spring-tip pairs 206a, 206b for limiting the motion of micromirrors 218 to a desired range, other embodiments may utilize other means. For example, it is generally recognized that micromirrors 202 may tilt in the positive or negative direction until micromirror 202 contacts a spring-ring or until a beam or yoke coupled to the hinge contacts landing pads.

For conventional DMDS, the surfaces of the address portion of each pixel element are typically disposed in planes that are parallel to the substrate or to the micromirror when in its neutral position. During operation of such conventional DMDs, as the micromirror approaches its landing position, portions of the micromirror are minimally spaced from the address portions, causing localized peak electrostatic fields. These localized fields may cause undesirable micromirror dynamics, including over-rotation and vertical hinge oscillation, which could cause destructive shorting between conductive layers of a pixel element. In addition, the electrostatic coupling within such conventional DMDs is typically limited to the overlap of each micromirror to two conductive planes.

Unlike conventional DMDs, the address portion of pixel element 226, in the illustrated embodiment, includes a pair of sloped electrodes 210 in addition to a pair of first electrodes 208 and a pair of second electrodes 212. In the illustrated embodiment, each sloped electrode 210 comprises a cantilever beam coupled to its respective address electrodes 212 and 208. Although the sloped profile of sloping surface 210 is substantially linear or planar, other embodiments may alternatively have a sloped profile that is curved or bent without departing from the scope of the present disclosure.

In operation, each sloped electrode 210a and 210b operates to redistribute the electrostatic fields along the length (l) of the micromirror 202 by balancing out localized field effects. In addition, each sloped electrode 210a and 210b introduces an additional plane of electrostatic coupling or attraction between the mirror portion and address portion of pixel element 226. That is, the surface of sloped electrode 210b, for example, may be disposed along a plane that intersects the planes associated with the surfaces of electrodes 208b and 212b. This additional plane of electrostatic coupling increases the conductive area associated with addressing micromirror 202 while effectively reducing the gap distance between the mirror portion and address portion of pixel element 226. The increased conductive area and reduced gap distance to micromirror 202 associated with each sloped electrode 210 can advantageously form an enhanced electrostatic field coupling within DMD 200.

In various embodiments, the enhanced electrostatic field coupling associated with each sloped electrode 210 can operate to increase the cross-over transition speed of micromirror 202. The phrase "cross-over transition speed" refers to the speed at which micromirror 202 transitions between its "on" state and "off" state. In addition, the enhanced electrostatic fields associated with each sloped electrode 210 more efficiently latches micromirror 202 in its active state, resulting in enhanced reliability.

The creation of electrostatic fields within each pixel element 226 may be effected through any of a variety of means. For example, portions of the pixel element 226 may receive a bias voltage that at least partially contributes to the creation of the electrostatic forces (e.g., a voltage differential) between the address portions, which includes address electrodes 208, 210 and 212, and the micromirrors 202. That is, a bias voltage may be applied to conductive conduit 216 that propagates through hinge vias 214, along hinge 204 and through mirror via 224 to each micromirror 202. In particular embodiments, the latching bias voltage comprises a steady-state voltage. That is, the bias voltage applied to conductive conduit 216 remains substantially constant while micromirror 202 is in an "on-state" or "off-state" position. In this example, the latching bias voltage comprises approximately twenty-six volts. Although this example uses a bias voltage of twenty-six volts, other latching bias voltages may be used without departing from the scope of the present disclosure.

As described above, CMOS substrate 220 comprises control circuitry associated with DMD 200. The control circuitry may comprise any hardware, software, firmware, or combination thereof capable of at least partially contributing to the creation of the electrostatic forces between the address portions (e.g., address electrodes 208, 210, and 212) and the micromirrors 202. The control circuitry associated with CMOS substrate 220 functions to selectively transition micromirrors 202 between "on" and "off" states based at least in part on data received from a controller or processor (shown in FIG. 1 as reference numeral 22). The control circuitry associated with CMOS substrate 220 transitions micromirrors 202 between "on" and "off" states by selectively applying an address or control voltage to at least one of the address electrodes 212a, 212b electrically connected to respective electrodes 208 and 210 associated with a particular micromirror 202. In particular embodiments, the control voltage is on the order of approximately three volts. Accordingly, to transition micromirror 202 to the active "on" state condition, the control circuitry removes the control voltage from electrode structure 212a (reducing, for example, electrode 212a from three volts to zero volts) and applies the control voltage to electrode structure 212b (increasing, for example, electrode 212b from zero volts to three volts) before the micromirror receives reset voltages. The combination of the electrostatic forces may selectively create a torque force that transitions the micromirror. Although a control voltage of three volts is described above, a control voltage of three volts is merely one example of a control voltage that may be selectively applied to electrodes 212a, 212b. It is generally recognized that other control voltages may be used without departing from the scope of the present disclosure.

In the illustrated embodiment, address electrodes 208a and 208b are formed in the hinge layer and address electrodes 212 and the conductive conduit 216 are formed within an inner conductive layer (also referred to sometimes as a Metal 3 or M3 layer). The inner conductive layer is disposed outwardly from an oxide layer 222, which operates as an insulator. For example, the oxide layer 222 may at least partially insulate CMOS substrate 220 from address pads 212a, 212b and conductive conduit 216. As another example, the oxide layer 222 may additionally or alternatively operate to at least partially insulate the address electrodes 212a, 212b from the conductive conduit 216.

Address electrodes 212 and conductive conduit 216 may comprise, for example, aluminum, an aluminum alloy or other conductive material. Where address electrodes 212 and conductive conduit 216 comprise an aluminum alloy, the aluminum alloy may comprise, for example, aluminum, silicon, polysilicon, tungsten, nitride, and/or a combination of these or other conductive materials. In this example, address electrodes 212 and conductive conduit 216 comprise silicon-based aluminum that has light absorbing and/or anti-reflective properties. In other embodiments, address electrodes 212 and conductive conduit 216 may include a dielectric material with anti-reflective properties disposed outwardly from the silicon-based aluminum layer.

By combining the DMD 200 with a suitable light source and projection optics (described above with regard to FIG. 1), the micromirror 202 may reflect incident light either into or out of the pupil of the projection lens 24. Thus, the "on" state of micromirror 202 appears bright and the "off" state of micromirror 202 appears dark. Gray scale may be achieved by binary pulse width modulation of the incident light. In some embodiments, color may be achieved by color filters, either stationary or rotating, in combination with one, two, or three DMDs 200. Other embodiments may achieve color by other means, such as, for example, colored light emitting diodes (LEDs).

In some implementations, keeping a sloped electrode 210 in a sloped position may be difficult because of the large electrostatic attraction between the micromirror 202 and the sloped electrode during operation. This large electrostatic attraction may cause micromirror 202 and sloped electrode 210 to collide. Contact between the sloped electrode 210 and the micromirror 202 may cause a shorting event, or if separated by a dielectric, may cause contact adhesion or disrupt the system dynamics in a way that inhibits reliability. Examples ways to address these issues are described with respect to FIGS. 2B and 2E.

FIG. 2B is a cross sectional view illustrating one example of a method of forming a portion of a digital micromirror device (DMD) 200. In this particular embodiment, each sloped electrode 210 is coupled to its respective address electrode 208. In addition, this particular embodiment comprises forming electrodes 228a and an electrode 228b inwardly from each respective sloped electrode 210a and 210b. Electrodes 228a and 228b may be electrically interconnected to control circuitry (not explicitly shown) capable of at least partially creating electrostatic fields between each sloped electrode 210 and its respective electrode 228. A sufficient electrostatic field will cause sloped electrodes 210 to slope inward from a less sloped position (as shown in FIG. 2C) to the position sloping away from micromirror 202 shown in FIG. 2B. For example, control circuitry may apply 30 volts to electrodes to 228 while grounding micromirror 202 and at least one of the address electrode structures (e.g., 208a, 210a, and 212a). Thus, because of the larger electrostatic field strength between sloped electrode 210a and electrode 228a, sloped electrode 210a slopes inward, or away from micromirror 202.

Figure 2D:
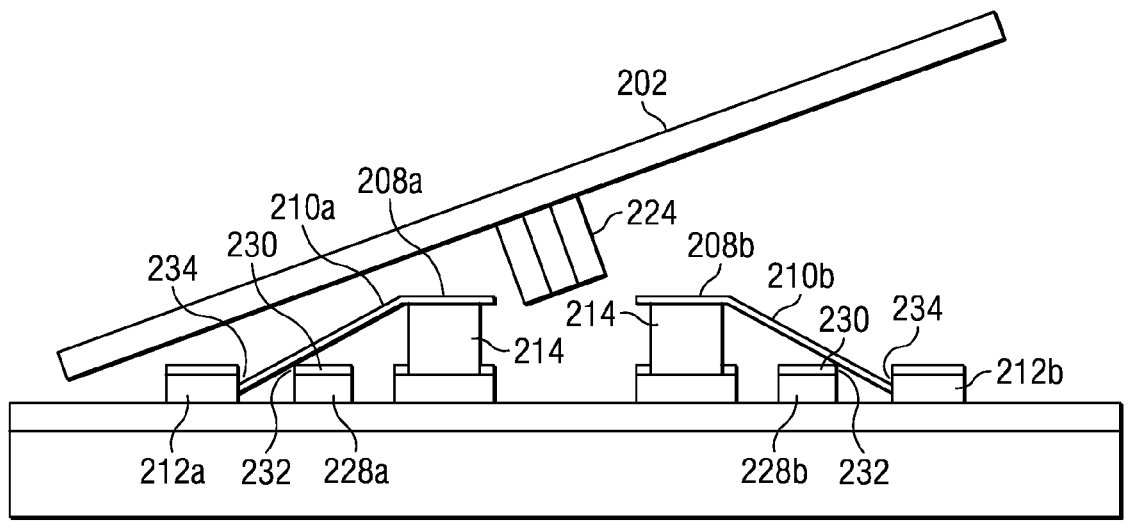

Some embodiments may use additional means to position sloped electrode 210 while minimizing the risk of contact between micromirror 202 and sloped electrodes 210. For example, prior to tilting micromirrors 202, sloped electrodes 210 may be preconditioned to slope inward by application of electrostatic fields between electrode 228 and sloped electrodes 210 over an extended period of time and at elevated temperatures. As another example, a dielectric layer (not explicitly shown) disposed outwardly from sloped electrodes 210 may minimize the risk of shorting between sloped electrodes 210 and micromirrors 202. In some embodiments, sloped electrode 210 may adhere or "micro-weld" to inwardly disposed electrodes, thus forming a permanently sloped profile. For example, some embodiments may form a dielectric layer (shown in FIG. 2D as reference numeral 230) disposed outwardly from electrodes 208, 212 and 228 that provides a contact surface to which sloped electrodes 210 may adhere (as shown by reference 232 in FIG. 2D). In such embodiments, the voltage differential between sloped electrodes 210 and electrodes 228 may permanently "microweld" sloped electrode 210 in a sloped position. Likewise, contact between sloped electrode 210 and electrode 212 may form a "micro-weld" (shown in FIG. 2D as reference numeral 234). As another example of contributing to the inward slope of sloped electrode 210, in some embodiments, the material stresses associated with the formation of each electrode 210 may respond to elevated temperatures by deforming or curling the cantilever beam portion inwardly, towards its respective address electrode 212.

Figure 2E:
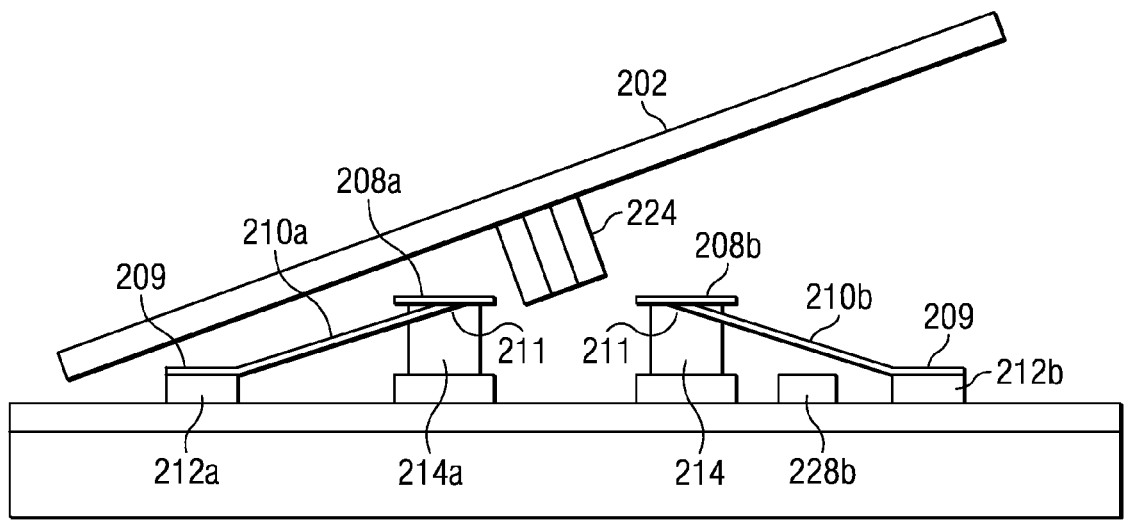

FIG. 2E is a cross sectional view illustrating one example of a method of forming a portion of a digital micromirror device (DMD) 200. In this particular embodiment, each sloped electrode 210 is formed initially with a fixed end 209 that is coupled to its respective address electrode 212 and a free end 211 that is free to pivot toward micromirror 202. During operation, as micromirror 202 tilts toward electrode 210, the increasing electrostatic fields due to the proximity of micromirror 202 with electrode 210 will cause the free end 211 of the respective electrode 210 to slope outward. Sloped electrode 210 may be designed and positioned to contact address electrode 208, thereby ensuring sloped electrode 210 does not short to the tilting micromirror 202. Thus, in this embodiment, sloped electrode 210 is positioned in a sloped position when micromirror 202 tilts toward sloped electrode 210 and may be less sloped when micromirror 202 is tilted away from sloped electrode 210. Although the sloped profile of sloping surface 210 is substantially linear or planar, other embodiments may alternatively have a sloped profile that is curved or bent without departing from the scope of the present disclosure.

Some embodiments may use additional means to position sloped electrode 210 while minimizing the risk of contact between micromirror 202 and sloped electrodes 210. For example, in some embodiments, contact between sloped electrodes 210 and electrodes 208 may form a "micro-weld" that permanently positions sloped electrode 210 in a sloped position. In addition, in some embodiments, the material stresses associated with the formation of each electrode 210 may respond to elevated temperatures by deforming or curling the cantilever beam portion outwardly, toward its respective address electrode 208.

Although the present invention has been described in several embodiments, a myriad of changes, variations, alterations, transformations, and modifications may be suggested to one skilled in the art, and it is intended that the present invention encompass such changes, variations, alterations, transformations, and modifications as falling within the spirit and scope of the appended claims.

What is claimed is:

1. A method of pivoting a micromirror:
   providing a substrate;
   providing a sloped electrode outwardly from the substrate;
   providing a sloped electrode positioning system outwardly from the substrate; and
   applying, by the sloped electrode positioning system, forces sufficient to position the sloped electrode in an orientation that slopes away from the substrate such that the sloped electrode substantially maintain their orientation relative to the substrate while the micromirror pivots relative to the substrate.

2. The method of claim 1, wherein the forces applied by the sloped electrode positioning system arise from electrostatic fields generated between the sloped electrode and a different electrode disposed inwardly from the sloped electrode.

3. The method of claim 1, wherein the forces applied by the sloped electrode positioning system arise from electrostatic fields generated between the micromirror and the sloped electrode.

4. The method of claim 1, and further comprising pivoting a free end of the sloped electrode until the free end permanently attaches to a different electrode.

5. The method of claim 4, wherein applying the forces sufficient comprises generating a voltage differential between the sloped electrode and the different electrode that at least partially contributes to the permanent attachment of the sloped electrode to the different electrode.

6. The method of claim 4, wherein the different electrode comprises a dielectric layer disposed outwardly from the different electrode.

7. The method of claim 4, wherein the fixed portion of the sloped electrode is formed with a gap to allow for increased compliance associated with pivoting the free end of the sloped electrode.

8. The method of claim 1, wherein applying the forces applied by the sloped electrode positioning system further comprises generating thermal expansion associated with the material stresses of the sloped electrode by heating.

* * * * *